(12) United States Patent
Frücht

(10) Patent No.: US 10,154,563 B2
(45) Date of Patent: Dec. 11, 2018

(54) ELECTRONIC BALLAST AND METHOD FOR CONTROLLING A LOAD

(71) Applicant: Eaton Protection Systems IP GmbH & Co. KG, Schönefeld (DE)

(72) Inventor: Johannes Frücht, Soest-Ampen (DE)

(73) Assignee: EATON PROTECTION SYSTEMS IP GMBH & CO. KG, Schönefeld (DE)

( * ) Notice: Subject to any disclaimer, the term of this patent is extended or adjusted under 35 U.S.C. 154(b) by 0 days.

(21) Appl. No.: 15/511,313

(22) PCT Filed: Sep. 17, 2014

(86) PCT No.: PCT/EP2014/002522
§ 371 (c)(1),
(2) Date: Mar. 15, 2017

(87) PCT Pub. No.: WO2016/041567
PCT Pub. Date: Mar. 24, 2016

(65) Prior Publication Data
US 2017/0290126 A1  Oct. 5, 2017

(51) Int. Cl.
*H05B 37/02* (2006.01)
*H05B 33/08* (2006.01)
*H02J 9/06* (2006.01)

(52) U.S. Cl.
CPC .............. *H05B 37/02* (2013.01); *H02J 9/06* (2013.01); *H02J 9/065* (2013.01); *H05B 33/0815* (2013.01)

(58) Field of Classification Search
CPC ............ H05B 33/0809; H05B 33/0815; H05B 33/0884; H05B 33/0887
(Continued)

(56) References Cited

U.S. PATENT DOCUMENTS 5,925,990 A * 7/1999 Crouse ............... H05B 41/2855
315/127
2006/0044303 A1* 3/2006 Lee ..................... H02M 1/4208
345/212
(Continued)

FOREIGN PATENT DOCUMENTS

AU    2013221964 A1    3/2014
EP     0490330 A1    6/1992
(Continued)

OTHER PUBLICATIONS

International Search Report for PCT Application No. PCT/EP2014/002522, dated Mar. 13, 2015, 6 pages.

*Primary Examiner* — Tung X Le
(74) *Attorney, Agent, or Firm* — Stinson Leonard Street LLP

(57) ABSTRACT

Electronic ballast for controlling at least one load, for example a lamp such as an LED, a fluorescent lamp, a gas discharge lamp or the like, comprising at least one resonant converter for generating a start and/or operating voltage from a rectified mains voltage of a mains voltage supply and comprising a mains rectifier for rectifying the mains voltage, where the electronic ballast has an electronic switching device that switches off the mains voltage supply in the event of emergency lighting, an emergency voltage can be fed into the electronic ballast, and different voltages can be determined and/or operating frequencies of the electronic ballast can be adjusted by way of an intermediate voltage circuit and/or an operating frequency circuit.

17 Claims, 1 Drawing Sheet

(58) Field of Classification Search
USPC .................................... 315/224, 294, 307
See application file for complete search history.

(56) References Cited

U.S. PATENT DOCUMENTS

| | | | | |
|---|---|---|---|---|
| 2010/0270949 A1* | 10/2010 | Onishi | ............... | H05B 33/0887 |
| | | | | 315/307 |
| 2011/0316449 A1* | 12/2011 | Imanaka | ............ | H05B 33/0815 |
| | | | | 315/307 |
| 2012/0146530 A1* | 6/2012 | Han | ................... | H05B 33/0815 |
| | | | | 315/219 |

FOREIGN PATENT DOCUMENTS

| | | |
|---|---|---|
| JP | 2010009858 A | 1/2010 |
| JP | 2012029374 A | 2/2012 |

* cited by examiner

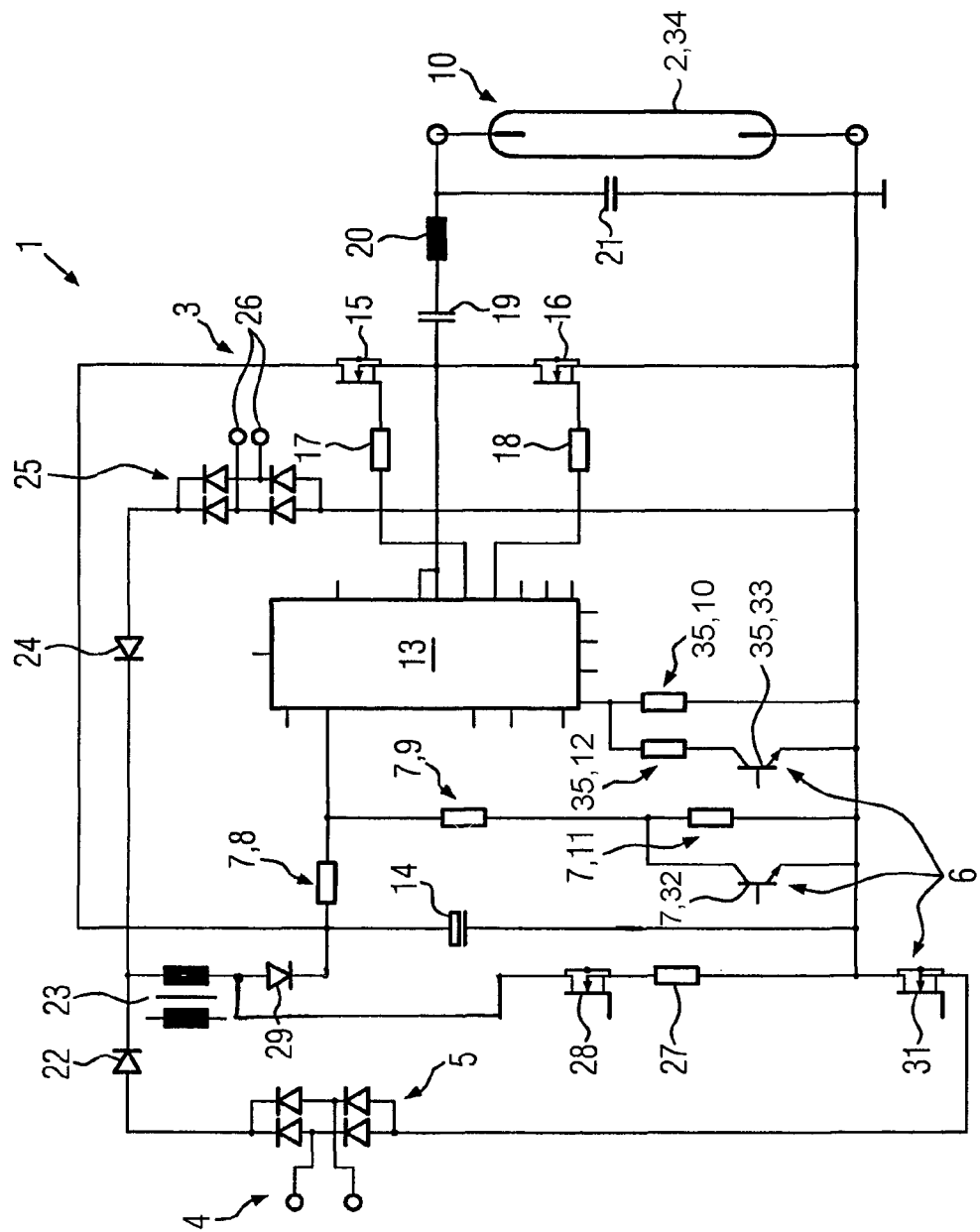

ELECTRONIC BALLAST AND METHOD FOR CONTROLLING A LOAD

CROSS-REFERENCE TO RELATED APPLICATION

The present application is a National Stage Entry of, and claims priority to, PCT Patent Application Serial No. PCT/EP2014/002522, filed Sep. 17, 2014.

FIELD OF THE DISCLOSURE

The invention relates to an electronic ballast which is used for controlling at least one load, in particular a lamp, such as an LED, a fluorescent lamp, a gas discharge lamp or the like. Such a ballast serves to possibly provide both a start or ignition voltage and, subsequently, an operating voltage for operating the respective lamp or load.

BACKGROUND OF THE DISCLOSURE

Known electronic ballasts generally have a mains rectifier, an intermediate circuit for providing an intermediate circuit voltage, a control module in the form of an integrated circuit, and in particular a resonant converter. When without a load, a correspondingly high voltage is generated to start a fluorescent lamp. If a different load, e.g. an LED is connected, a resonant circuit is attenuated so that no increased voltage is generated.

BRIEF DESCRIPTION OF THE DRAWING

FIG. 1 shows a basic circuit of a ballast according to the invention for the operation in the event of mains voltage supply and in the event of emergency voltage supply.

DETAILED DESCRIPTION

A high voltage is generally required for igniting a lamp after it is switched on, see start or ignition voltage. The respective lamp is then operated with the operating voltage. At the same time, there is a need to operate respective lamps via the electronic ballast at higher frequencies, such frequencies typically amounting to 20 kHz or more. At least one lamp can be supplied by a corresponding electronic ballast, possibly even two or more lamps. The respective lamp can also be dimmed via the electronic ballast, or further safety measures, such as overvoltage disconnection, undervoltage disconnection, disconnection at the end-of-life phenomenon, and the like can be performed.

Such an electronic ballast can as a separate component be associated with a respective lamp or can also be installed therein.

In some fields of application of a lamp, the latter is to be supplied both by mains voltage and by an emergency voltage in the event of failure of the mains voltage supply. This means, switching over to the emergency voltage supply must be possible. This has hitherto been done by a separate emergency lighting converter which as a separate component supplies the respective lamp in the event of emergency lighting, where e.g. a battery voltage or accumulator voltage is usable as an emergency lighting voltage.

The invention is based on the object of improving an electronic ballast of the type initially mentioned in such a way that, in the event of emergency lighting, an appropriate supply of the load via the electronic ballast occurs in a safe and, if necessary, also adjustable manner without any additional separate emergency lighting converter.

The invention is according to the method characterized in that, by way of the electronic ballast, firstly, the mains voltage supply is in the event of mains supply rectified via a mains rectifier and a start or operating voltage is generated by way of a resonant converter, and, secondly, in the event of emergency lighting, an electronic switching element of the electronic ballast shuts down the mains voltage supply and an emergency voltage and/or operating frequency of the electronic ballast are adjusted by way of the intermediate voltage circuit and the operating frequency circuit.

This object is according to the device satisfied, in particular, by an electronic switching element as part of an electronic switching device of the electronic ballast for switching off the mains voltage supply in the event of emergency lighting, where a corresponding emergency voltage can as a substitute be fed into the electronic ballast and a different voltages can be determined and/or operating frequencies of the electronic ballast can be adjusted by way of the intermediate voltage circuit and the operating frequency circuit in the event of emergency lighting. This means that e.g. the same resonant converter of the electronic ballast is used both in the event of mains voltage supply as well as in the event of emergency lighting, whereby the intermediate voltage circuit and the operating frequency circuit are employed depending on the supply situation, and the mains voltage supply is switched off in particular in the event of emergency lighting by way of an electronic switching element.

This means that no separate emergency lighting converter with, for example, its own resonant converter, its own series resonant circuit or the like is necessary. Instead, only the emergency voltage is separately supplied and otherwise those respective parts of the electronic ballast are used which are also used in the event of mains voltage supply. The mains voltage supply is switched off in the event of emergency lighting. In the event of emergency lighting, the intermediate circuit voltage can be influenced by the intermediate voltage circuit and the operating frequency can be influenced by the operating frequency circuit.

It is in this context further to be noted that the operating frequency circuit can also be used to adjust the operating frequency in the event of mains voltage supply and also in the event of emergency lighting. This means that an operating frequency adjustment, which is also be carried out in event of emergency lighting, can also be carried out for different mains voltage levels.

The switching device further comprises a corresponding electronic switch with which the mains voltage supply can in the event of emergency lighting be switched off when the respective mains voltage is too low. If such disconnection of the mains voltage supply is lacking, then an overvoltage disconnection could occur in the event of emergency lighting.

In a preferred exemplary embodiment, both the intermediate voltage circuit as well as the operating frequency circuit can be formed from different, in particular, switchable resistor combinations.

In a simple embodiment, the electronic switching device can for switching off the mains voltage supply be interconnected in series between the mains voltage supply and the resonant converter or the electronic ballast member. The electronic switching device comprises at least one electronic switching element which can be configured in particular as a transistor, preferably a field effect transistor. If the mains voltage supply is switched off by this switching element, then the emergency voltage supply can be switched on accordingly.

The common mains alternating voltage is generally used as a mains voltage supply. It is rectified by the mains rectifier in the form of a bridge rectifier and the mains rectifier is connected to the electronic ballast member via a mains filter device (diode).

A simple embodiment of such a mains filter device has at least one diode.

The rectified mains voltage is via a diode supplied to the electronic ballast member. A boost transistor can be controlled by a control module and can in conjunction with a boost choke and a boost diode generate an increased intermediate circuit voltage for the resonant circuit converter that is stored in the capacitor. The magnitude of the intermediate voltage is determined by a voltage divider. Such an intermediate circuit voltage is e.g. during mains operation adjusted by the voltage divider to 420 V. Other voltages are of course possible, where the respective voltage values depend on the type of resonant converter, the type and number of lamps and the like. In the simplest case, this first resistor combination comprises two resistors.

As a rule, adjustment of an operation frequency of the electronic ballast also occurs, where this can be effected by way of a frequency variable resistor as part of the operating frequency circuit which is connected from the control module to the ground of the resonant converter.

It is in this context also conceivable that not only one frequency variable resistor is employed but also several frequency variable resistors connected in series.

In order to enable a respective supply of emergency voltage into the electronic ballast in a simple manner, a separate emergency voltage rectifier can in correspondence to the mains voltage rectifier be provided as part of the electronic ballast. The emergency voltage is then supplied via this emergency voltage rectifier.

The respective emergency voltage is in the event of emergency lighting provided to the emergency voltage rectifier via a push-pull converter from a respective battery voltage or accumulator voltage.

This push-pull converter is accordingly connectable to the emergency voltage rectifier.

The emergency voltage can in this context be supplied via the emergency voltage rectifier and an associated diode device to the electronic ballast member.

In order to enable a simple switchover to the emergency voltage and respective variations of the voltage and the frequency in the event of emergency lighting, the electronic ballast can comprise at least one parallel circuit comprising an electronic emergency switch/switching element and an emergency resistor, where the electronic emergency switch can in the event of emergency lighting be switched off and the emergency resistor together with in particular the first resistor combination forms a second resistor combination for determining a second intermediate circuit voltage. This means that the respective emergency resistor can be additionally switched separately to the first resistor combination so that this results in a second resistor combination which forms a further voltage divider that serves to determine the second intermediate circuit voltage. The emergency switching element, the emergency resistor and the first resistor combination there form the intermediate voltage circuit.

Analogously, the electronic ballast can have a series circuit comprising at least one further electronic switching element and a further resistor in parallel with the frequency variable resistor. The frequency variable resistor, which, for example, in the event of mains voltage supply determines the respective operating frequency, can there be replaced with the further resistor, which in this case determines a different operating frequency of the electronic ballast. The switching element, the further resistor and the frequency variable resistor as a further switchable resistor combination there form the operating frequency circuit.

As already stated, the electronic ballast member can in addition to the control component and the charging capacitor comprise at least two transistors and a series resonant circuit which are arranged, for example, between the control module and the load and serve to respectively operate the load.

Respective protective devices of the control module, such as, for example, protective devices for overvoltage disconnection, undervoltage disconnection or for shut-down in the event of the so-called end-of-life phenomenon, can advantageously be used not only for the mains voltage supply but also for the emergency voltage supply.

In the embodiment shown, ballast 1 according to the invention is configured to control a load 2, which is a lamp, in particular an LED, a fluorescent lamp or a gas discharge lamp or the like. Load 2 is via a resonance converter 3 connected to a mains voltage supply 4. In addition to resonant converter 3, electronic ballast 1 comprises a mains rectifier 5 and a DC voltage intermediate circuit composed of a diode 22 and a boost choke 23 as well as a further diode (boost diode) 29. Mains rectifier 5 is used to rectify the respective mains voltage which is transferred to a higher intermediate circuit voltage and applied to charging capacitor 14 in a smoothed manner. The corresponding intermediate circuit voltage is determined by a voltage divider formed by a first resistor combination 7 with resistors 8 and 9. For example, a corresponding voltage value can be 420 V. However, this value is given only by way of example, where other voltage values can also be present depending on the electronic ballast used, the type and number of lamps connected and the like.

In the case of mains voltage supply 4 in the embodiment illustrated, a first electronic mains switching element 31 and a further electronic emergency switching element 32 are switched on, so that an emergency resistor 11 being connected in parallel to this electronic emergency switching element is bridged. A respective operating frequency of ballast 1, see also control module 13, is determined by way of a frequency variable resistor 10. Parallel to this frequency variable resistor 10, a further electronic switching element 33 is in series connection connected to a further resistor 12.

Electronic mains switching element 31, resistors 8, 9 and emergency resistor 11 form an intermediate voltage circuit 7 and switching element 33, frequency variable resistor 10 and resistor 12 form an operating frequency circuit 35.

The mains voltage of mains voltage supply 4 is in the event of emergency lighting switched off by mains switching element 31. A respective emergency voltage is via a push-pull converter—not shown—applied to emergency voltage terminals 26 of an emergency voltage rectifier 25. The latter is likewise part of electronic ballast 1. The respective emergency voltage is supplied via emergency voltage rectifier 25 and a second diode 24 connected in series therewith.

First, mains switching element 31 and somewhat later, emergency lighting switching element 32 is switched off in order perform the start with an increased intermediate circuit voltage. As a result, a new resistor combination and a new voltage divider are determined, see, firstly, the voltage divider of resistor 8 and, secondly, resistors 9 and 11. This new resistor combination results in a new intermediate circuit voltage at charging capacitor 14. This new intermediate circuit voltage can, for example, assume 200 V, 350 V or even a different voltage value, which is respectively determined in dependency of the load. Resistor 11 can consist of one or more resistors.

Generally, the corresponding intermediate circuit voltage can not be arbitrarily reduced. In order to enable further reduction of the lamp output in the event of emergency lighting, the operating frequency of the electronic ballast can be increased.

This is done by switching on electronic switching element 33, whereby resistor 12 is switched in parallel to previous frequency variable resistor 10. As a result, the resistance value is reduced by the new resistor combination of resistors 10 and 12 that are connected in parallel and the electronic ballast is operated at a higher frequency. This higher frequency causes further reduction of the lighting current. Resistor 12 can consist of one or more resistors.

According to the invention, for example, 1.5 hours of emergency lighting operation with a slightly reduced lighting current and 3 hours of emergency lighting operation with a significantly reduced lighting current can be maintained with the respective electronic ballast in the circuit shown in FIG. 1 from the same battery via the push-pull converter and emergency voltage rectifier 25.

Remaining resistors 17, 18, electronic switching elements 15, 16 as well as capacitors 19, 21 and inductor 20 serve to directly control the respective load on the part of control module 13. However, it is in this context again pointed out that this respective supply of load 2 as lamp 34 on the part of the control module 13 is shown only by way of example. Where load 2 is actually connected to control module 13 can be changed by configuration of the control module, just like the actual circuitry of lamp 34 via resistors 17, 18, electronic control elements 15, 16 or capacitors 19 or 21, respectively, and inductor 20. This circuitry depends, for example, also on the type and number of lamps 34.

It arises overall from the present invention that a load and in particular a lamp in the form of an LED, a fluorescent lamp or a gas discharge lamp are operated via the same circuit both in the event of mains voltage supply as well as in the event of emergency lighting. No separate component or no separate emergency lighting converter is necessary which would possibly be switched on by a mechanical switch or the like in the event of emergency lighting to supply the respective load. All protective devices already present in ballast 1 can according to the invention instead also be used in the event of emergency lighting, such as an end-of-life disconnection, overvoltage/undervoltage disconnection and the like.

As described above, the lighting current is in the event of emergency lighting reduced, see the corresponding adjustment of the operating frequency as well as the reduction of the intermediate circuit voltage so that only small temperature development arises because the respective output is in the event of emergency lighting less than in the event of mains voltage supply.

This leads, for example, to an increased life span of the electronic components.

Furthermore, other devices of the electronic ballast can be used in both types of supply, such as EMC filters or the like.

The invention claimed is:

1. An electronic ballast for controlling at least one load, comprising:
   at least one resonant converter for generating a start and/or operating voltage from a rectified mains voltage of a mains voltage supply;
   a mains rectifier for rectifying said mains voltage;
   an electronic switching device configured to switch off said mains voltage supply in the event of emergency lighting in which an emergency voltage of an emergency voltage supply is, as an intermediate circuit voltage, fed into said electronic ballast, the electronic switching device comprising:
      an intermediate voltage circuit configured to enable determination of different intermediate circuit voltages of said electronic ballast, and
      an operating frequency circuit configured to enable adjustment of operating frequencies of said electronic ballast.

2. The electronic ballast of claim 1, wherein said intermediate voltage circuit and/or said operating frequency circuit are each formed by switchable resistor combinations.

3. The electronic ballast of claim 1, wherein said electronic switching device comprises at least one electronic mains switching element connected in series between said mains voltage supply and said resonant converter.

4. The electronic ballast of claim 1, wherein said mains rectifier is a bridge rectifier and is connected to said resonant converter via a mains filter device.

5. The electronic ballast of claim 4, wherein said mains filter device comprises at least one diode and one boost choke.

6. The electronic ballast of claim 1, wherein a first resistor combination of said intermediate voltage circuit in the event of mains voltage supply forms a voltage divider and determines an intermediate circuit voltage applied to a charging capacitor of said resonant converter.

7. The electronic ballast of claim 6, wherein said first resistor combination comprises at least two resistors.

8. The electronic ballast of claim 6, further comprising at least one parallel circuit comprised of an electronic emergency switching element and an emergency resistor,
   wherein in the event of an emergency, said electronic emergency switching element is configured to be switched off,
   wherein said emergency resistor and said first resistor combination comprise a second resistor combination for determining a second intermediate voltage circuit, and
   wherein said emergency switching element, said emergency resistor, and said first resistor combination comprise said intermediate voltage circuit.

9. The electronic ballast of claim 8, wherein said emergency resistor is comprised of one or more resistors.

10. The electronic ballast of claim 1, further comprising a control module, wherein said operating frequency circuit comprises a frequency variable resistor connected in series from said control module to the ground of said resonant converter.

11. The electronic ballast of claim 10, further comprising a series circuit including at least one electronic switch and a resistor parallel to said frequency variable resistor, wherein said switch, said resistor and said frequency variable resistor as further switchable resistor combinations comprise said operating frequency circuit.

12. The electronic ballast of claim 1, further comprising an emergency voltage rectifier for supplying said emergency voltage.

13. The electronic ballast of claim 12, wherein said emergency voltage rectifier is connected to a push-pull converter generating said emergency voltage.

14. The electronic ballast of claim 12, further comprising a diode device, wherein said emergency voltage rectifier and said diode device are configured to feed said emergency voltage into said resonant converter.

15. The electronic ballast of claim 1, wherein said resonant converter comprises a control module, a charging capacitor, at least two transistors, and a series resonant circuit.

16. The electronic ballast of claim 15, wherein said control module comprises one or more protective devices for over/undervoltage disconnection and/or for end-of-life disconnection.

17. A method for controlling at least one load via an electronic ballast, comprising:
- rectifying a mains voltage via a mains rectifier, wherein the mains voltage is supplied by a mains voltage supply;
- generating a start or operating voltage via a resonant converter;
- switching off said mains voltage supply, via an electronic switching element of a switching device of said electronic ballast, in the event of emergency lighting; and
- adjusting an emergency voltage fed into said electronic ballast from an emergency voltage supply in the event of emergency lighting by:
    - adjusting an intermediate circuit voltage of said electronic ballast via an intermediate voltage circuit of said switching device, and
    - adjusting an operating frequency of said electronic ballast via an operating frequency circuit of said switching device.

* * * * *